(12) United States Patent  
Roskowski

(10) Patent No.: US 7,865,194 B2
(45) Date of Patent: Jan. 4, 2011

(54) SYSTEMS AND METHODS FOR CHARACTERIZING THE PERFORMANCE OF A WIRELESS NETWORK

(75) Inventor: Steve Roskowski, Mountain View, CA (US)

(73) Assignee: Carrier IQ, Inc., Mountain View, CA (US)

(*) Notice: Subject to any disclaimer, the term of this patent is extended or adjusted under 35 U.S.C. 154(b) by 569 days.

(21) Appl. No.: 11/403,263

(22) Filed: Apr. 13, 2006

(65) Prior Publication Data

US 2007/0243881 A1 Oct. 18, 2007

(51) Int. Cl.
H04W 24/00 (2009.01)

(52) U.S. Cl. ...................... 455/456.5; 379/21
(58) Field of Classification Search ............ 455/456.5, 455/456.6
See application file for complete search history.

(56) References Cited

U.S. PATENT DOCUMENTS

| | | | |
|---|---|---|---|
| 5,095,500 A * | 3/1992 | Tayloe et al. ............ | 379/32.01 |
| 6,711,404 B1 * | 3/2004 | Arpee et al. ............. | 455/423 |
| 2001/0036824 A1 * | 11/2001 | Hamabe .................. | 455/422 |
| 2004/0203928 A1 * | 10/2004 | Nevin et al. ............. | 455/457 |
| 2006/0025158 A1 | 2/2006 | Leblanc et al. | |
| 2008/0051093 A1 * | 2/2008 | Ojala et al. ............. | 455/439 |
| 2008/0054072 A1 * | 3/2008 | Katragadda et al. ...... | 235/384 |

* cited by examiner

Primary Examiner—Rafael Pérez-Gutiérrez
Assistant Examiner—Marcos Batista
(74) Attorney, Agent, or Firm—Workman Nydegger

(57) ABSTRACT

Systems and methods for characterizing a performance of a wireless network. Data or metrics are collected from a device. The metrics include timing information associated with certain sectors. The timing information can be used to determine an approximate location of the device when the call or other use of the device occurred. A device rating is used to contribute the metrics of the device to bins of a grid that describes the wireless network. Only the bins associated with the approximate location of the device receive the contribution of the metrics. The metrics from other devices are similarly contributed to specific bins. As more usage of the devices occurs, the bins reflect the performance of the wireless network. The device ratings of the devices can also be updated based on the bin ratings and other data associated with the bins.

34 Claims, 3 Drawing Sheets

SYSTEMS AND METHODS FOR CHARACTERIZING THE PERFORMANCE OF A WIRELESS NETWORK

CROSS-REFERENCE TO RELATED APPLICATIONS

Not applicable.

BACKGROUND OF THE INVENTION

1. The Field of the Invention

Embodiments of the invention relate to wireless communications networks and related systems and devices. More particularly, embodiments of the invention relate to systems and methods for characterizing network performance by collecting data from multiple network devices that are associated with multiple locations of a network.

2. The Relevant Technology

As a result of advances in technology and corresponding increases in the number of wireless device uses, the size and complexity of wireless communications networks has greatly increased. From the perspective of the provider of the wireless network, the operation and maintenance of a wireless network presents several general concerns. One concern, for example, relates to the deployment of the wireless network and another concern relates to the optimization of the wireless network.

The processes of deploying and optimizing a wireless network obviously have an impact on the resulting performance of the wireless network. As a result, these processes are given considerable thought. Deploying wireless networks, for example, involves identifying the best possible locations for towers. Even though optimal tower locations might be identified, this does not suggest that these locations are available. In fact, tower locations can be severely constrained by local municipalities as well as other real world restrictions (environmental concerns, existing structures, etc.). As a result, the actual tower locations may not be optimally placed.

The process of deploying and optimizing cellular networks further involves configuring the antennae of the towers with regard to direction and power to provide the right amount of capacity for a given region. The performance or optimization of a wireless network is also dependent on other parameters such as neighbor lists, add and drop timers, CDMA parameters, and the like. Typically, these parameters are set during deployment using available information and tools.

Even though all available data is used to deploy and optimize a wireless network, actual use of the network inevitably reveals various gaps in the network's performance. In other words, differences between the assumptions made in deploying and optimizing the network and real world conditions emerge. These differences can manifest themselves as drop call metrics, increased calls to customer service, and the like.

Once a problem in a wireless network is confirmed or identified, the provider often needs to reproduce the problem in sufficient detail so as to analyze and resolve the problem. Conventional methods for deploying and/or optimizing wireless networks often includes the use of mobile probes and network simulators.

Mobile probes include, by way of example, truck based call probes, truck based RF survey probes, and autonomous probes. In truck based call probes, the truck is instrumented with multiple devices that place calls as the truck is driven to a previously identified area of interest. The performance of the calls can be collected and analyzed to diagnose the issue. In truck based RF survey probes, a radio scanner is placed in a truck. The radio scanner measures the radio performance on a frequent sampling basis and the resulting data is used to correlate the performance of network models with the real world response and to improve the design of wireless networks.

The primary drawback of truck based call probes and RF survey probes is that these probes are reactive tools. Because the issue in a given wireless network may not real or has been misidentified, the probe may be unable to detect the issue or may detect a separate unrelated issue. Detecting an unrelated issue can be detrimental to the optimization of the wireless network because it may create a false relationship between a described issue and the root cause. Further, truck probes do not reflect real customer usage or network load conditions. Truck probes, for example, are unable to go inside buildings and can only scan a limited area.

An autonomous probe uses instrumentation similar to the instrumentation used in truck based call probes and RF survey probes. In this case, the autonomous probes are typically deployed in vehicles (such as commercial vehicles) that move around a given area for various reasons. The data collected over time can be uploaded periodically and provides data over the regions covered by the vehicle without incurring the cost of a deployed vehicle. While autonomous probes are relatively inexpensive, they also do not represent real user traffic on a network.

Network simulators are tools that can calculate the performance of a network in great detail. Unfortunately, the calculations generated by network simulators often varies significantly from the real world because of inaccurate data sets. In other words, the network model is not what was actually deployed due to deployment or data entry error or due to model errors (the real world is different from a simulated environment). While RF survey probes can collect data to help tune and refine the models used by network simulators, this process is expensive and does not cover the entire radio environment being modeled.

Optimization tools use radio simulation data to optimize a radio deployment network around the simulation data. The obvious drawback to these optimization tools is that they are dependent on the accuracy of the network models, which is often suspect as described above. Further, optimization tools also depend on usage models. Predicting how and where people will be using their wireless devices is very difficult and the resulting usage models may have significant errors.

In sum, the ability to deploy and/or optimize radio networks suffers from multiple issues. Real world data that represents an entire network is difficult and expensive to collect with conventional probes. Network simulators and optimization tools are flawed or rely on data that does not accurately reflect the real world. Usage patterns and data sets used by these tools are not accurate. There is therefore a need for systems and methods for evaluating the performance of a network and for optimizing radio networks are needed.

BRIEF SUMMARY OF THE INVENTION

These and other limitations are overcome by embodiments of the present invention, which relates to systems and methods for characterizing the performance of a wireless network as well as the performance of devices operating within the wireless network. Embodiments of the invention provide a mechanism for using instrumented end user devices to provide an accurate representation of a radio network and of device performance. The data collected from the end user devices can be advantageously used by existing systems including simulators and optimizers to improve the deployment and optimization of wireless radio networks.

Using end user devices, however, to collect data representing the wireless network presents several problems. The amount of information that can be collected from an instrumented device, for instance, may be limited. Further, the end user device may be contributing to the collected data as much as the environment in which the device operates is contributing to the collected data. Further identifying the precise location of a user device with, for example, GPS systems introduces high overhead that may be impractical, while alternative location algorithms may introduce approximate locations into the network analysis.

Embodiments of the invention overcome the limitations of end user devices by using data points from multiple devices to characterize the network. Using data collected from multiple devices significantly reduces errors and variances that may be attributable to a particular device or set of devices. Embodiments of the invention further characterize the performance of individual devices such that the performance of the network is measured in a baseline manner and such that devices with poor performance can be identified and removed from the system. The data collected from instrumented devices can be used to generate an accurate network model even when the location of the end devices may not be precisely identified or approximated.

Embodiments of the invention can measure the RF (Radio Frequency) performance of a network using contributions from the devices operating in the network. These contributions from the devices operating in the network accumulate over time to produce data that represents the RF performance of a wireless network. In one embodiment, the network is represented as a collection of bins that form a grid. Using the location of a device during use, the metrics or data representative of the device's use and of the wireless network can be contributed to the bins associated with the current location of the device. Over time, multiple devices contribute to the various bins of the network. As a result, a confidence level of the bins increases as more devices contribute metrics. Further, the metrics associated with specific bins can then be used to characterize the devices contributing metrics to those bins. As a result, each device operating in a network can have a device rating and the system can place a confidence level on the data contributed by specific devices. The data associated with the bins or with the grid can then be used, for example, in customer service, network tuning and planning (including tower deployment and network optimizations), device returns, and network triage.

For example, data is collected for each call made by multiple devices in a network. The data includes location data, which can be processed to identify an approximate location of the device in the wireless network. Advantageously, embodiments of the invention can utilize approximate locations as well as more precise locations. The location data can be used to characterize performance of the network and/or device for that approximate location.

In one embodiment, a wireless network is represented by a grid that includes multiple grid locations (also referred to herein as bins). The location data provided by a device can be used to identify specific bins in the grid that are associated with the usage of the device. The other data provided by the device (e.g., signal to noise ratio, sectors used, noise margin, etc.) can then be analyzed and contributed to those specific bins. As a result, all of the devices in a network that are properly instrumented can contribute metrics to bins. The bins that receive the metrics of a device are identified by the approximate location of the device during the corresponding use of the device.

The device is also, for example, associated with a device rating that includes the device accuracy and device confidence. The device rating can have an impact on how the data collected by the device is contributed to the corresponding bins of the grid. Over time, the device rating can be adjusted and the rating of the various bins in the grid can also change as contributions from other devices are added to those bins. The data collected by a particular device can therefore be used to alter or improve that device's rating.

Over time, the grid data, which includes all of the data associated with the various bins in the grid, can provide a holistic view of the performance of the wireless network. The grid data reflects the RF performance of the network with fine grained granularity and can be used, for example, to identify faulty devices or coverage holes, tune the network, plan for network expansion, plan new networks, provide customer care, identify other issues such as neighborless problems, strong pilot, etc., and the like.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
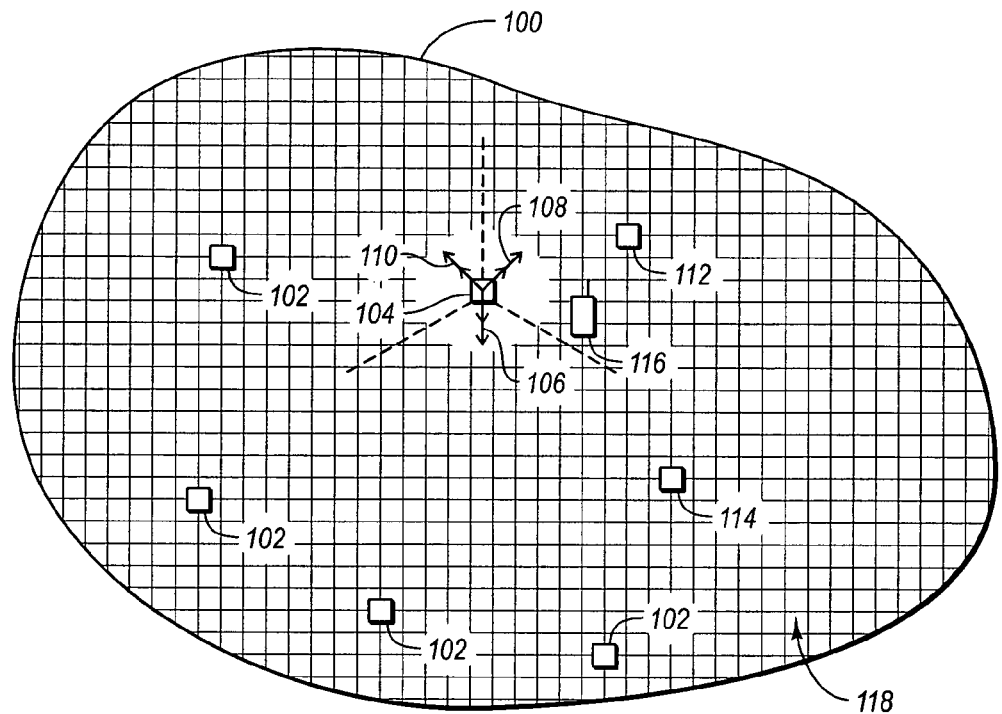
FIG. 1 illustrates one embodiment of a wireless communications network that can be represented by grid that includes grid locations or bins.

Embodiments of the invention relate to systems and methods for characterizing wireless communications networks as well as devices that operate within the wireless communications networks. Embodiments of the invention also relate to systems and methods for contributing data (also referred to herein as metrics) collected from devices operating in the network to a data set that characterizes the performance of the wireless network. Advantageously, the ability to characterize or monitor wireless communications networks as well as the devices that use these networks generates data that is indicative of the strengths and weaknesses of the communication networks and can be used to improve the performance of the network.

The data collected and generated by embodiments of the invention can be used, by way of example, to provide improved customer service, to tune existing networks, to facilitate handset or device returns or identify other device issues, to plan wireless communications networks, and to ensure wireless coverage. Embodiments of the invention enable the radio frequency (RF) performance of a wireless system (including the network itself and the devices in the network) to be characterized with varying degrees of granularity.

Embodiments of the invention, for example, enable decisions to be made regarding whether a device is working properly, identify and rectify problem areas in networks, and specifically identify the problems or issues of the networks and/or the devices operating therein. The network and/or devices can be characterized in terms of ratings that reflect confidence in specific grid locations, confidence in the device, and confidence in the accuracy of the device.

Embodiments of the invention include cellular telephones, but one of skill in the art can appreciate that other devices including pagers, laptop computers, personal digital assistants, or other devices that utilize wireless networks will also benefit from a characterization of the respective wireless network.

For a cellular telephone, each wireless call or other usage of the telephone generates certain data or metrics that can be reported by the phone. RF metrics, transaction metrics, location metrics, and the like, are examples of data that can be collected by each device each time a call is made. The metrics can also include the specific configuration of the telephone for the specific usage. These metrics can be collected and later analyzed regardless of whether the call was a good call or a bad call and regardless of the type of call that was made. Data can be collected for devices that do not actually achieve a network connection. Data can also be collected by devices outside of calls, enabling dramatically more sampling of the RF environment, but not providing feedback on success or failure of call attempts.

Further, data collected in the wireless network may be representative of a network transaction whether a call is involved or not. The data ultimately binned to the grid is representative of a transaction that occurred in the network. As a result, the source of the data can be any device operating in the network and is not limited to end-user devices. Network probes, drive through trucks, network monitoring equipment, and the like can also data sources that generate data that can be processed and used in analyzing the performance of a wireless network. The various sources of data (end user devices, network probes, network monitoring equipment, etc.) are therefore collectively referred to as devices.

As more devices in a wireless communications network make calls, the information from all of the devices can be accumulated and analyzed to provide a statistical contribution to a characterization of the wireless communications network. Advantageously, the contributions of all devices begin to exclude certain types of issues that may provide bad data and a more precise view of the wireless communications network begins to form. In other words, certain errors do not appear to be systematic and the contributions made by multiple wireless devices can reduce the overall error.

The wireless communications network can be represented as a grid, where each grid location or bin on the grid corresponds to a physical area. Once the area or the approximate area of a wireless device is known, the data generated or associated with the call made by the phone can by analyzed and contributed to the affected bins that correspond to the approximate location of the device. Over time, as additional devices make calls from that can be attributed to the same approximate location, a reliable description or characterization of the wireless network at that location develops.

This description or characterization that is developed over time can be used in servicing the wireless communication network and the devices that use the wireless network. Advantageously, it is not necessary to pinpoint the location of a device, but an approximate location is sufficient. One reason that the approximate location is sufficient is that the characterization of the network associated with the bins in that approximate location reflect contributions of metrics from more than one device. Because the characterization of the grid is based on the contributions received from multiple devices, the impact of errors from one or two or even more devices tends to be minimized. This is particularly true as the ratings for the devices operating in the network become more defined by repeated usage. The contributions from a device with a low device rating, for example, may be given less weight in the grid.

Generally, embodiments of the invention effectively use data points collected from devices operating in the network to characterize the network and for optimization purposes. In contrast to probes, the data collected from end user devices represents real usage from real locations throughout the radio network. In addition to characterizing the performance of the radio network, the performance of individual devices can also be characterized.

Devices that operate or perform below expectations can be removed from the calculations or can be excluded from the characterization of the network. The ability to identify poorly performing devices can also reduce cost and improve customer satisfaction. Further, embodiments of the invention enable relatively poor quality location data to be used in the generation of an accurate network model.

FIG. 1 illustrates one exemplary environment for implementing embodiments of the invention. FIG. 1 illustrates a wireless network 100. The wireless network 100 may also include an interface to other networks including computer networks such as the Internet. The wireless network 100 includes multiple towers 102, 104, 112, and 114 that are positioned in the network 100. Each tower typically includes more than one sector and devices in a network typically communicate with other devices and other networks through the sectors of the towers 102.

In this example, each tower in the network 100 is typically associated with more than one sector and each tower usually has more than one antenna: one for each sector. The tower 104 is an example of a tower that includes the antennas 106, 108, and 110, each of which is associated with a corresponding sector. When a device, such as the wireless device 116 uses the wireless network 100, it typically communicates with one or more of the sectors. In this example, the device 116 may communicate with the sectors of the towers 104, 112, and 114.

The device 116 typically includes a diagnostic client that collects information related to the call made by the device 116 or related to the usage of the network 100. This information may include, but is not limited to, RSSI (Received Signal Strength Indicator), which sectors of the network 100 were used for the call, EC/IO, noise margin, the fact that a call was made, whether the call was dropped and what type of call drop occurred. The information may also include timing or clock information from each or some of the sector of the towers 104, 112, and 114. The timing or clock information is used to identify the location of the device. This information can include, by way of example, a timestamp from the tower 104 or from a sector of the tower 104 and a delta with respect to this timestamp from the sectors of the towers 112, and/or 114.

The timestamp information can be used to locate the device 116 within the network 100. In this example, FIG. 1 illustrates a partial grid 118, although all of the network 100 can be represented by such a grid. Each location or bin in the grid 118 corresponds to a physical area. For example, each grid location or bin may correspond to 100 square meters. Once the location of the device 116 is known or at least approximately known, the information provided by the device 116 can be analyzed and associated with the grid locations that correspond to the use of the device 116. Because the data is analyzed and contributed to the grid, the location data determines which bins receive the benefit of the data collected for the call. Because a cellular telephone is mobile, it is likely that the data from another call will be contributed to different bins in the grid 118.

FIG. 1 generally illustrates the use of many data points (the data collected from each device or each device in a set of devices operating in the network 100 is an example of a data point) that are collected from multiple end user devices. A data point may therefore include, but is not limited to, data collected from a device at a precise or approximate location. In this context, the use of a grid 118 provides a mechanism for generating a statistical analysis of the data collected by the instrumented devices on a geographic basis as data points are contributed wholly and/or partially to a specific bin or to a set of bins.

The data collected by a particular device is associated with the location of that device. Because the location may not be determined precisely, the data collected from that device can be distributed to one or more bins in the grid. Over time, as more devices contribute metrics to the various bins in the grid, the statistical and accurate network model can be computed.

Embodiments of the invention also use data associated with network traffic. For example, the devices operating in a network can sample radio performance and configuration in and around user traffic. The location for a correlated point in the user traffic can also be sampled. The accumulated radio and configuration data is binned into the appropriate bins of the grid and results in an accurate representation of the network's performance for real users and real world conditions.

The actual call performance can also be used as an indicator of a network problem or of a device configuration problem. Call blocks, call drops, poor call quality, and the like can be indicative of problems and used to identify areas in the network that need to be addressed. Further, signatures (a collection of various parameters and associated values that tend to identify a particular problem) can be used to estimate certain properties. For example, the signature of a dropped call due to a neighbor list error is different from the signature for a dropped call due to poor signal quality. These signatures can be applied to the data to estimate call properties and assist in the network analysis.

Further, the collected data or metrics received from a device can also include device configurations. This enables the network to be analyzed from the perspective of various device configurations. Devices can also be instrumented to sample the radio network periodically to collect metrics rather than only collecting metrics during use of the device. Sampling the network in this manner provides data for network characterization and is not necessarily related to any particular problem or issue.

The overall result of this data collected from end user devices, as shown in FIG. 1, is an accurate characterization and representation of the wireless network, the network usage, and characterization of the performance of individual devices. The ability to measure or characterize the performance of a radio network has the advantages of being autonomous, being less costly, and providing better coverage than conventional simulators, optimization tools, and probes. In addition, the collected data is representative of real world calls so it accurately reflects usage and user experience, significantly aiding in business decisions.

Conventional systems often attempt to resolve issues in a radio network by having an engineer examine a single call to identify the issue. Embodiments of the invention, in contrast, look at multiple calls or other uses of devices operating in the network to directly measure what is happening in the radio network, thereby more accurately identifying the root cause of a given problem in the radio network or with a device operating in the network.

Figure 2:
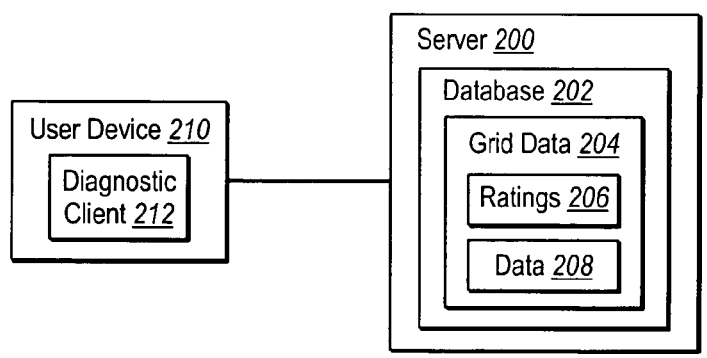
FIG. 2 illustrates one embodiment of a diagnostic client embedded in a device that communicates data that can be contributed to grid data maintained by a server.

FIG. 2 illustrates a server 200 that is used to store and/or analyze data collected by devices in a wireless network. The grid data 204 includes data from multiple devices operating in the wireless network 100 and characterizes the performance of the network 100. At the same time, the device itself can be characterized using the grid data 204. As discussed above, end user devices such as the device 210 are used to collect information characterizing the network 100. However, the user device 210 may not be properly characterized for various reasons: antennas break, parts wear out, etc. Embodiments of the invention, in addition to collecting information from end user devices, also enables the devices themselves to be characterized. This enables bad or poorly performing devices to be removed from circulation based on device characterization and can save costs in the areas of customer support, logistics, and user churn, for example. Further, embodiments of the invention enable the user devices to be rated to correct for their inaccuracies and to insure that the grid data 204 is not skewed by poorly performing devices. This improves the grid data 204 represented by the grid in FIG. 1.

The characterization of end user devices is accomplished, in one embodiment, by establishing a rating system. The rating system reflects both a device rating or accuracy and a confidence level in the device rating. Similarly, a confidence level and rating is also established for the grid as a whole and/or for specific bins or grid locations in the grid.

When a device contributes collected data to the grid as described herein, the rating system is employed. For example, if the contribution of the collected data matched or substantially matched existing data in the grid, then the rating of the device is increased. In one example, the device rating is based on how well its contribution matched existing data in the grid or in the bins associated with the device's location. Next, the confidence level of the device is also updated accordingly. The confidence level is increased if the contribution data matched or substantially matched existing data.

The confidence level is decreased if the device's contribution does not match the existing data. The confidence level of the grid or of specific bins in the grid may also be decreased in this case because the contribution of the device does not match existing data. The adjustments to ratings and confidence levels can be weighted as well using existing ratings.

The rating of the grid or of one or more bins is also updated along with the confidence of the grid of grid locations. The rating of the grid or grid locations may increase because of changes in the number of devices that have contributed data to the grid. This has a corresponding impact on the confidence level of the grid or of specific bins.

With a rating system in place, a device operating in the network can now be characterized. Devices having a rating that is considered to be below a threshold value (indicating poor performance) and whose confidence level is above a threshold (indicating enough results have been collected to accurately reflect device performance) can be characterized as bad devices. These devices can be removed from the network and can facilitate the return process that may be initiated by the end user.

In order to collect metrics or information that can be binned and in order to characterize the device itself, the device is usually instrumented, though it is also possible to achieve substantially similar results using network based location systems (which measure the position of individual phones by triangulation from the base station) and monitoring message traffic. In this example, the user device 210 includes a diagnostic client 212 that collects information related to use of the device. If the device is a cellular telephone, for example, then the collected information often relates to data and/or voice calls made with the cellular telephone. The data 208 collected by the diagnostic client 212 may include, but is not limited to, signal to noise ratio for calls, number of calls dropped, reasons for dropped calls, sectors used or identified for the calls, location data, timing information from the sectors, noise margins, and the like and any combination thereof. The data 208 may also include device configuration data.

The diagnostic client 212 can then transmit the collected data through the wireless network where it ultimately arrives at a server 200. The collected data is analyzed and then contributed to the grid data 204 in the database 202 of the server 200. The collected data can be used to adjust ratings for the bins of the grid as well as ratings of the device.

The grid data 204, therefore, includes the data 208 collected by devices operating in a wireless communication networks as well as ratings 206. Each bin of the grid is associated with specific ratings 206 and with specific data 208. The ratings 206 include, by way of example, a confidence rating for that particular bin. The confidence rating for a particular bin can increase, for example, each time new data is added to that particular bin. If the data collected for a particular bin varies widely from one device to the next, then the confidence rating for that bin may decrease. At the same time for a particular bin, if the data collected by a particular device varies from data collected from other devices, then the rating of the device may by changed. However, it usually takes more than a single event to have a substantial impact on the ratings of a particular device or on the ratings of a particular bin.

Figure 3:
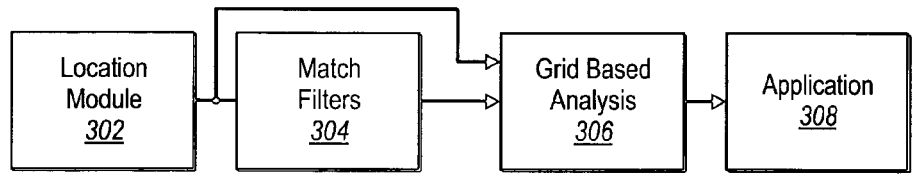
FIG. 3 illustrates one embodiment of characterizing data used in a grid analysis and illustrates that the grid data is used in network applications.

FIG. 3 illustrates a system and method for collecting data from a wireless device that is used to characterize the performance of a wireless network in one embodiment. After receiving the data from a device, a location module 302 identifies the location of a wireless device in the wireless network. According to exemplary embodiments of the invention, identifying the location of a wireless device is not required to be exact determination, but can be an approximate location.

Once the location data from the device, which can include timing information from one or more sectors as well as an identification of the sectors, is analyzed, the location data of the device is typically described in terms of latitude and longitude, although the location information can be presented in alternative forms. For example, because the location data may be imprecise, one or more grid locations or bins may be associated with the approximate location of the wireless device identified location module 302. The bins associated with the approximate location can be described using, for example, an ellipse or other geometric formulation. Advantageously, this type of representation can be compact and can be easily applied to other wireless devices as well. Representing the location information in a concise manner facilitates or helps identify which bins are included in the location information.

Optionally, other data collected from the phone and/or the location data, can be analyzed using match filters 304. Match filters are described in copending U.S. patent application Ser. No. 11/403,265, filed the same day as the present application and entitled ANALYSIS OF ARBITRARY WIRELESS NETWORK DATA USING MATCH FILTERS, which application is hereby incorporated by reference in its entirety. Generally stated, match filters 304 can inspect an arbitrary data feed (data collected from wireless devices, server logs, and the like) and can compute, combine, transform and evaluate an unlimited number of combinations of meta data. Processing the data in this manner enables the detection of signatures in the data that may correspond to various events including, but not limited to, root causes for call failures, data transfer rates, user visible errors, voice quality, and statistics on network access attempts. Other signatures may include, by way of example, unpromoted strong pilot, neighborless problems, coverage problems, in-building conditions, and the like. By identifying specific data points using the signatures, each bin can be associated with these types of data points. The signature based contributions are similarly rated and accumulated to the other radio metrics, providing similar statistical accumulation and confidence improvement.

Figure 4:
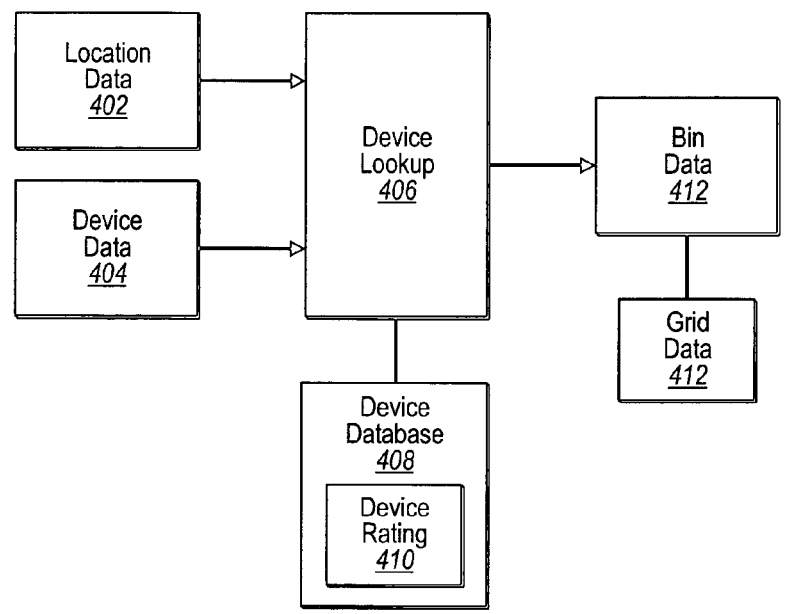
FIG. 4 illustrates one embodiment of a system where data from a device is associated with a location, analyzed and then binned in the grid data.

Next, a grid based analysis 306 is performed and is described in more detail with respect to FIG. 4. After the grid based analysis 306 is performed, the resulting data can be used in various applications 308. Exemplary applications include, customer care, network triage, network tuning, handset returns, and network planning.

The grid based analysis 306 analyzed the data from the device to identify the nature of the problem, if a problem is present. The match filters 304 analyze the data to identify some problems based, for example, on certain signatures. The RSSI, EC/IO, a call, a dropped call, can be determined from the data received from the device. This information can be used to discern characteristics about the network in the associated approximate location of the device.

In some embodiments, certain data about the phone can also be used in assessing the network and/or the device. The ROM version, the PRL version, device settings, for example, can have an impact on the ability of the device to use a network. For example, a setting change, a new ROM version, may change which sectors a particular device can communicate with or alter how a device interacts with the wireless network. As a result, a device may begin to experience dropped calls or other problems in locations where problems were not previously experienced. This can be used to identify the root cause.

FIG. 4 illustrates an example of the grid based analysis 306. In FIG. 4, the data associated with a particular call or other use of a device includes the location data 402 and the device data 404. The location data 402 may include or identify the towers or more specifically the sectors that were in communication with the device as well as a clock value or other timing data for each sector. The timing data, along with the location of the towers, can be used to approximate the location of the device in the wireless network. The device data 404 is typically collected by a diagnostic client and may include, as previously stated, signal to noise ratio, signal strength, RSSI, EC/IO, noise margin, sectors used, signatures and the like or any combination thereof. Similar information can be collected regardless of whether the call or use of the device was successful.

The device data collected by the diagnostic client typically includes information that uniquely identifies the device. This information is used during device lookup 406, which accesses a device database 408 to obtain the device rating 410 of the device. The device rating includes a representation of the device accuracy and a representation of confidence in the device as described previously. Initially, the device accuracy or rating is high. The device confidence is initially low as the device has not contributed to the grid. Over time, the device rating 410 is adjusted based on experience and as the device contributes data to the grid data 414.

After the device rating 410 is obtained, the data collected by the device is binned 412 in the grid data 414 using the device rating 410. Specifically, the data for a particular call is binned in the bins associated with the location or the approximate location of the device in the network.

Each bin or grid location is also associated with a confidence rating as well as other data, such as the data collected by the device or with data points identified by the match filters. For each call associated with a particular bin, the confidence rating of the bin typically increases for that bin because new data or additional data is added to the bin.

For example, once the data from the device has been analyzed, it may be compared to existing data associated with the appropriate bins. If the device data does not correspond to the existing data, then the device rating 410 may be adjusted accordingly. In one embodiment, however, no single event has a significant impact on a device rating. Over time, as additional data is received and contribution process is run, the device rating is adjusted.

The grid data 414 therefore reflects a statistical expectation. The contributions of many devices are accumulated in the various bins in the grid data 414. As contributions from multiple devices are made, the rating and confidence of both the device and the grid or of specific bins in the grid are ranked. At the same time, the history and confidence of the both the device and the grid are improved. Properly operating devices are identified and their confidence can increase, poorly operating devices can also be identified and removed from consideration in the network. At the same time, coverage holes and other problems can be identified as the data accumulates in the bins.

Thus, the grid data 414 can be used in various applications 308. For example, consider a bin or grid location where the data from multiple devices indicates that the network has exceptional performance. When a device reports poor performance for that grid location, it is an indication that the device is experiencing problems rather than the communication network. In contrast, when multiple devices report poor performance, it is an indication that coverage is poor. This information can then be used to alter the sectors associated with that grid, and the like.

Figure 5:
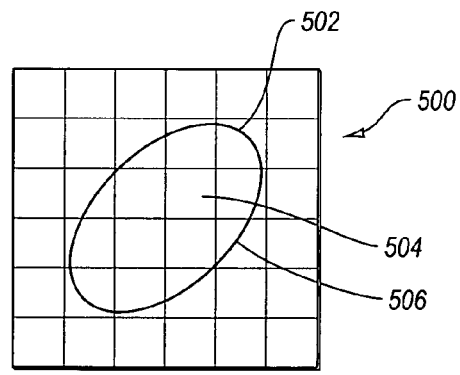
FIG. 5 illustrates one embodiment of a method for representing a location of a device in a wireless network.

FIG. 5 illustrates one representation of the location data 502. As previously indicated, the location of a device may not be determined with precision. However, in situations where precise location data is available, it may be used to contribute the device's data to the grid 500. In this example, however, the location data 502 is approximate. Because the location data 502 is an approximation of the device's location, the data contributed by the device to the grid is contributed to multiple bins or grid locations.

Representing the location as an ellipse as shown in FIG. 5 is one example of identifying the grid locations to which the device's data is contributed. One of skill in the art can appreciate that other shapes may be used to represent location data. An ellipse is predictable in terms of size and computational complexity and is also flexible in terms of location estimates.

FIG. 5 illustrates a grid 500 on which the location data 502 is drawn as an ellipse. The ellipse 502 is one representation of an approximate location of a device in the grid 500 based on, for example, timing data received from one or more sectors and known locations of those sectors. In this example, the ellipse represents an area of confidence (e.g., 90% confident that the device is located in the area covered by the ellipse). The ellipse 502 is one representation of latitude and longitude information, although one of skill in the art can appreciate that other representations of the location data can be implemented.

In the example of FIG. 5, the ellipse 502 is an approximation of the location of a device and includes more than one grid location or more than one bin. For example, the grid location 504 is wholly included within the ellipse 502 while the grid location 506 is only partially included in the ellipse 502. In one embodiment, the portion of a grid location within the ellipse 502 impacts how the bins touched by the ellipse 502 of the grid data 414 are updated.

For example, the contribution of a particular device can be divided among all of the grids within the associated ellipse 502. Thus, the grid location 504 may receive a 20% contribution while the grid location 506 may only receive a 10% location. Alternatively, all of the data can be included in each grid location that is at least partially within the ellipse 502. One of skill in the art can appreciate other methods for contributing the data associated with a particular call to the bins wholly or partially identified by the location data 402 and represented by the ellipse 502. The location data 402 therefore determine which bins or grid locations in the grid of the wireless network are updated with the call data.

One advantage of embodiments of the invention is that the RF performance of the system as a whole can be measured with varying degrees of granularity. Based on the grid data that is accumulated over time and that corresponds at least to actual device usage, decisions can be made relative to whether devices are operating properly, whether certain locations in the network have problems, and the like. In addition, the grid network may be used or may suggest various issues.

Figure 6:
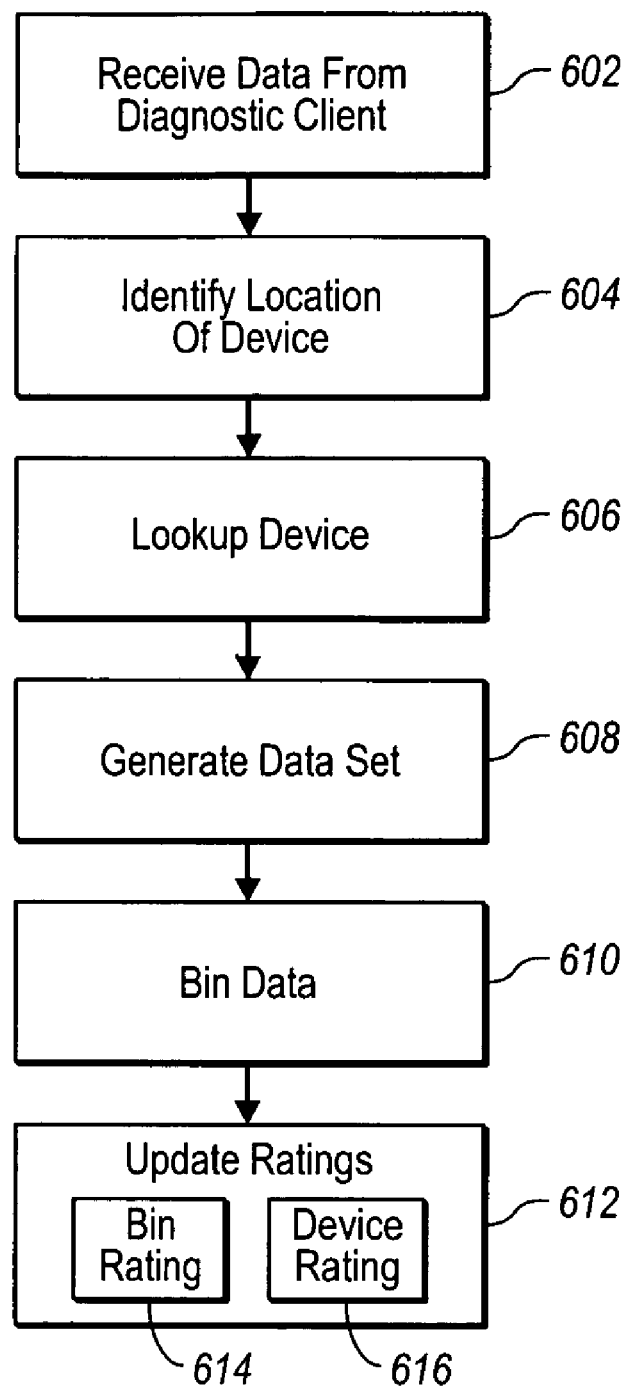
FIG. 6 illustrates one embodiment of a method for contributing device data to a database of grid data.

FIG. 6 illustrates an exemplary method for contributing data to bins of a grid. When a device is used in the wireless network or an event occurs (a call is made, a call is dropped, etc.), a diagnostic client collects data. A server or other system then receives the data from the diagnostic client 602. The data received from the diagnostic client typically includes timing information from multiple sectors or towers and identifies the sectors or towers. Using this information, the location of the device is determined or identified 604. The identification of the device's location can be an approximation as previously stated and be associated with more than one bin of the grid. Preferably, the location information is represented in a concise form such as an ellipse.

Next, the data from the diagnostic client is used to look up the device and identify the device rating 606. As previously stated, the device rating includes, by way of example, a device accuracy and a device confidence. A data set is then generated 608. The data set includes the device rating and the location data of the device.

The data set can then be analyzed and the data is binned 610 in the bins that correspond to the location data included in the data set. Finally, the ratings are updated 612. This can include, for example, updating the bin rating 614 and updating the device rating 616.

Embodiments of the invention have been described above in the context of at least end-user devices. Embodiments of the invention, however, are not limited to data sets derived from end user devices but also encompasses data sets from other devices or other sources that may include, but are not limited to, network probes, drive test trucks, and the like. Data from these other sources can also be binned, thereby contributing to the ability to analyze the performance of a wireless network. Many of these devices or sources can generate data that reflects actual network usage.

While the initial rating of an end user device that has made few contributions to the grid is initially low, the confidence rating can improve over time as more contributions to the grid are made. In the case of a device such as a network probe, however, the initial confidence rating may be higher because the probe has been calibrated and tested. Thus, the ability of the probe to contribute useful data to the bins of the grid can be different. For example, the initial contributions of a probe may be given more weight because it has been tested and calibrated. The statistical contributions of these devices or from these other data sources can be accumulated and contributed as described herein. Thus, multiple data sources may contribute data to the grid representing a wireless network. Contributing data to the grid from multiple sources results in a faster convergence with higher accuracy. In other words, embodiments of the invention contemplate the use of diverse data sets collected from different types of devices or data sources or other network processes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for characterizing a performance of a wireless network, the method comprising:
   receiving data from multiple end user devices operating in the network, wherein the data corresponds to real world usage of the devices while operating in the network, wherein the data received from each device includes timing data and wherein the network is represented by a grid having bins;
   determining a location of each device based on the timing data, wherein the location of each device is associated with one or more bins of the grid;
   identifying a device rating associated with each device, the device rating indicating a previously determined device accuracy and confidence level attributed to the device; and
   binning the data received from the multiple devices in the one or more bins according to the corresponding device ratings, wherein the data in the one or more bins provides a holistic view of the performance of the wireless network over time as the multiple devices contribute data to the one or more bins.

2. A method as defined in claim 1, wherein determining a location of each device based on the timing data further comprises determining an approximate location of each device.

3. A method as defined in claim 2, wherein determining an approximate location of each device further comprises identifying one or more sectors communicating with each device.

4. A method as defined in claim 1, wherein receiving data from multiple device further comprises collecting data regarding usage of each device.

5. A method as defined in claim 4, wherein collecting data regarding usage of each device includes, for each device, one or more of:
   collecting data regarding a call;
   collecting data regarding a dropped call;
   collecting data regarding a signal to noise ratio for the device;
   collecting data regarding an RSSI of the device;
   collecting data regarding clock data from one or more sectors;
   collecting data regarding the device, including ROM version, PRL version, and device settings; and
   collecting data outside of a call collecting data relating to a signature associated with usage of the device.

6. A method as defined in claim 1, wherein identifying a device rating associated with each device further comprises identifying a device accuracy and a device confidence, wherein at least one device is one of an end-user device, a network probe, or network monitoring equipment.

7. A method as defined in claim 1, wherein binning the data received from each device in the one or more bins further comprises binning the data in each of the one or more bins based on an overlap between each of the one or more bins and the location of each device.

8. A method as defined in claim 1, wherein binning the data received from the device in the one or more bins further comprises comparing the data received from the device with a confidence rating and bin data of each of the one or more bins.

9. A method as defined in claim 1, further comprising adjusting at least one of the device rating of the devices for each of the multiple devices and adjusting a bin rating of each of the one or more bins.

10. A method as defined in claim 1, further comprising identifying one or more data points for the data received from each device, wherein the one or more data points are identified using match filters.

11. A method for characterizing a performance of a wireless network using data collected from devices operating in the wireless network, the method comprising:
   collecting a data set from a set of devices operating in a wireless network, wherein the data set that includes both an approximate location of each device operating in a wireless network and metrics related to each device, wherein the data set corresponds to real world conditions;
   determining a device rating for each device in the set of devices, the device rating indicating a device accuracy and confidence attributed to the devices;
   contributing the metrics from each device to at least one bin of a grid that represents the wireless network based on at least the device rating of each device and a bin rating of the at least one bin, wherein the metrics are weighted according to the device rating and the bin rating; and
   characterizing a performance of the wireless network based on the metrics contributed to bins in the grid from the set of devices, wherein the metrics in the bins of the grid provide a holistic view of the performance of the wireless network over time as multiple devices contribute metrics to the at least one bin.

12. A method as defined in claim 11, wherein collecting a data set that includes both an approximate location of a device operating in a wireless network and metrics related to the device further comprises receiving the metrics from each device in the set of devices, wherein the metrics from each device includes timing data from one or more sectors that communicated with each device.

13. A method as defined in claim 11, wherein the metrics of each device include one or more of RF metrics and transaction metrics.

14. A method as defined in claim 13, wherein the RF metrics include one or more of RSSI, signal to noise ratio, noise margin, signature, and sector traffic.

15. A method as defined in claim 13, wherein the transaction metrics include one or more of: sectors that communicated with the device; whether a call of the device was dropped; a type of dropped call, call duration; and timing data from each of the sectors.

16. A method as defined in claim 11, further comprising generating an ellipse that describes the approximate location of the device.

17. A method as defined in claim 11, wherein the approximate location of each device in the set of devices is associated with one or more bins of the grid.

18. A method as defined in claim 11, wherein contributing the metrics from each device to at least one bin further comprises comparing the metrics of the device with metrics already contributed to the at least one bin of the grid from other devices.

19. A method as defined in claim 18, wherein contributing the metrics from each device to at least one bin further comprises adjusting the contribution based on at least one of the device rating, which includes a device rating a confidence level, and a confidence rating of the at least one bin.

20. A method as defined in claim 11, further comprising updating the device rating based on one or more uses of the device including calls.

21. A method as defined in claim 20, further comprising:
updating each device rating based on a comparison of the contribution of the device to the at least one bin with data existing in the bin; updating a confidence level of each device; and
updating a rating and a confidence level of the at least one bin.

22. A method as defined in claim 11, wherein each device is one of an end-user device, a network probe, or network monitoring equipment.

23. A method as defined in claim 11, wherein collecting a data set that includes both an approximate location of a device operating in a wireless network and metrics related to the device from a set of devices operating in the wireless network further comprises collecting a second data set from a second data source, wherein devices in the second data source are calibrated and have a higher initial rating than the set of devices.

24. A method for characterizing a performance of end use devices operating in a wireless network, the method comprising:
representing a wireless network as a grid, the grid having one or more bins each having a bin rating;
identifying one or more bins associated with each location of multiple devices operating in the wireless network;
determining a device rating of each device, the device rating indicating a device accuracy and confidence attributed to each device;
contributing metrics from each device to the one or more bins associated with the location of each device, wherein the metrics are weighted according to each device rating and wherein the metrics define real usage of each device operating the wireless network; and
characterizing each device based on the metrics contributed by each device and metrics existing in the one or more bins receiving the contributed metrics, wherein the one or more bins provide a holistic view of the performance of the wireless network as each device contributes metrics at least some of to the one or more bins.

25. A method as defined in claim 24, wherein identifying one or more bins associated with each location of multiple devices operating in the wireless network further comprises identifying an approximate location of a use of each device using timing data from one or more sectors used by each device.

26. A method as defined in claim 24, wherein the metrics of each device characterize an RF performance of each device for the use of the device.

27. A method as defined in claim 24, further comprising contributing metrics to the one or more bins from a second data source, the second data source including at least one of network probes or network monitoring equipment.

28. A method as defined in claim 26, wherein the metrics of each device include one or more of: RSSI; sectors used for the call; type of call drop; ROM version, PRL version, device settings; signal to noise ratio; signature data; and timing data from the sectors.

29. A method as defined in claim 24, wherein determining a device rating of each device further comprises accessing a database to access the device rating of each device using an identifier of each device.

30. A method as defined in claim 24, wherein contributing metrics from the device to the one or more bins further comprises comparing the metrics with the existing metrics associated with the one or more bins.

31. A method as defined in claim 29, further comprising adjusting each device rating based on the comparison between the metrics of the device and the existing metrics associated with the one or more bins.

32. A method as defined in claim 30, further comprising:
updating a confidence level of each device based on how the metrics contributed with each device correlates with the existing metrics;
updating a confidence level of the one or more bins after receiving the metrics of each device; and
updating a rating of the one or more bins based on the existing metrics and the metrics contributed from each device.

33. A method as defined in claim 24, further comprising including device configuration in the metrics such that a view of the wireless network from a perspective of device configuration is include in the one or more bins.

34. A method as defined in claim 24, further comprising:
establishing the device rating system for the devices, the device rating system including the device rating and a confidence level of each device;
establishing a confidence rating for each of the one or more bins of the grid;
updating, each time each device contributes metrics to the grid:
the device rating of each device based on how the contributed metrics match the existing metric in the one or more bins of the grid;
the confidence level of each device based on how the contributed metrics match the existing metric in the one or more bins grid, wherein the confidence level of each device and a confidence level of the one or more bins receiving the contributed metrics are decreased if the contributed metrics do not match the existing metrics in the one or more bins of the grid;

the rating of the one or more bins, wherein the rating of the one or more bins reflects a number of devices that have contributed metrics to the one more bins; and a confidence level of the one or more bins of the grid.

* * * * *